March 25, 1924.
J. VENHUIZEN
CORN HARVESTER
Filed July 14, 1921
1,488,368
3 Sheets-Sheet 3
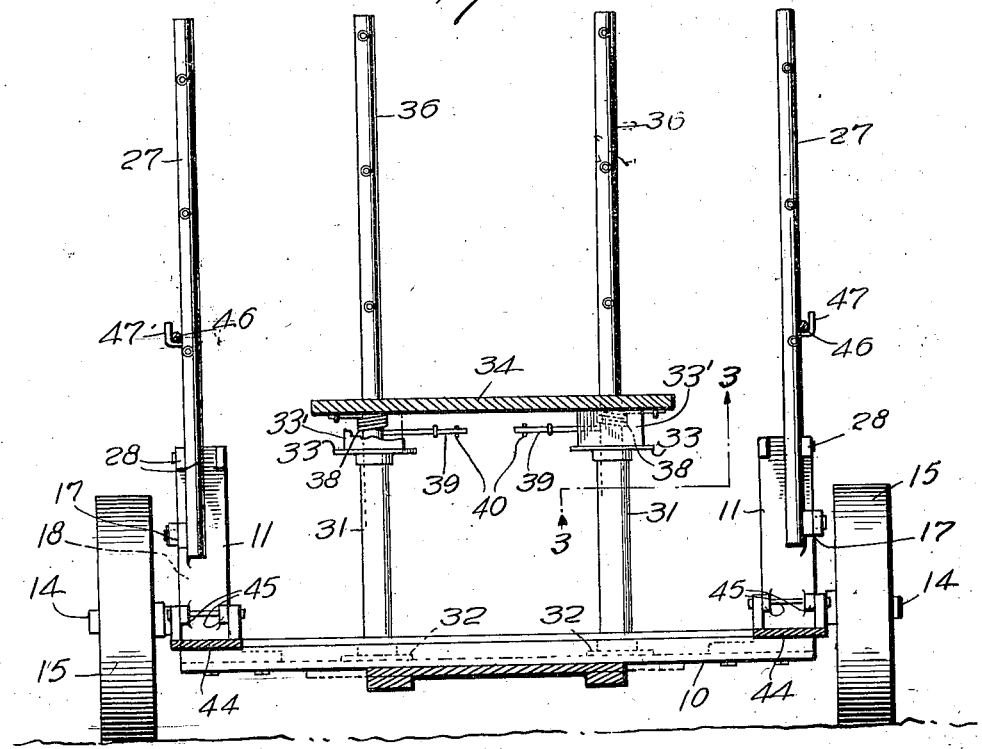
Fig. 5.
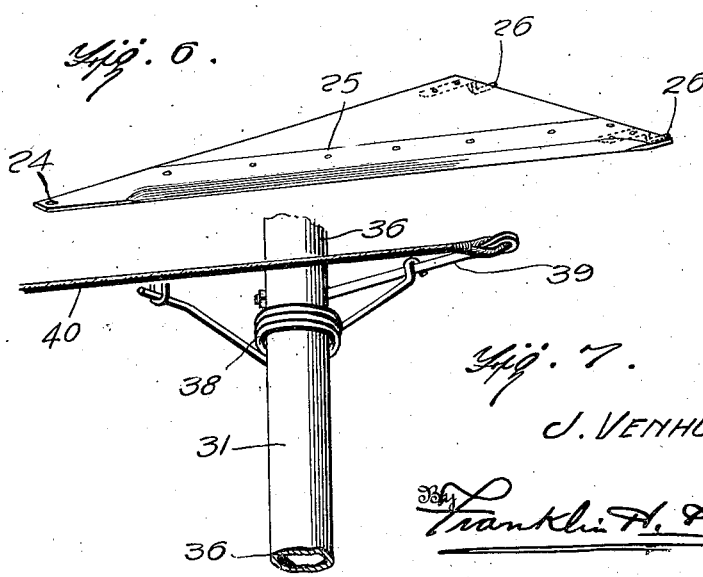
Fig. 6.
Fig. 7.
Inventor
J. VENHUIZEN,
By Franklin H. Hough
Attorney Patented Mar. 25, 1924.

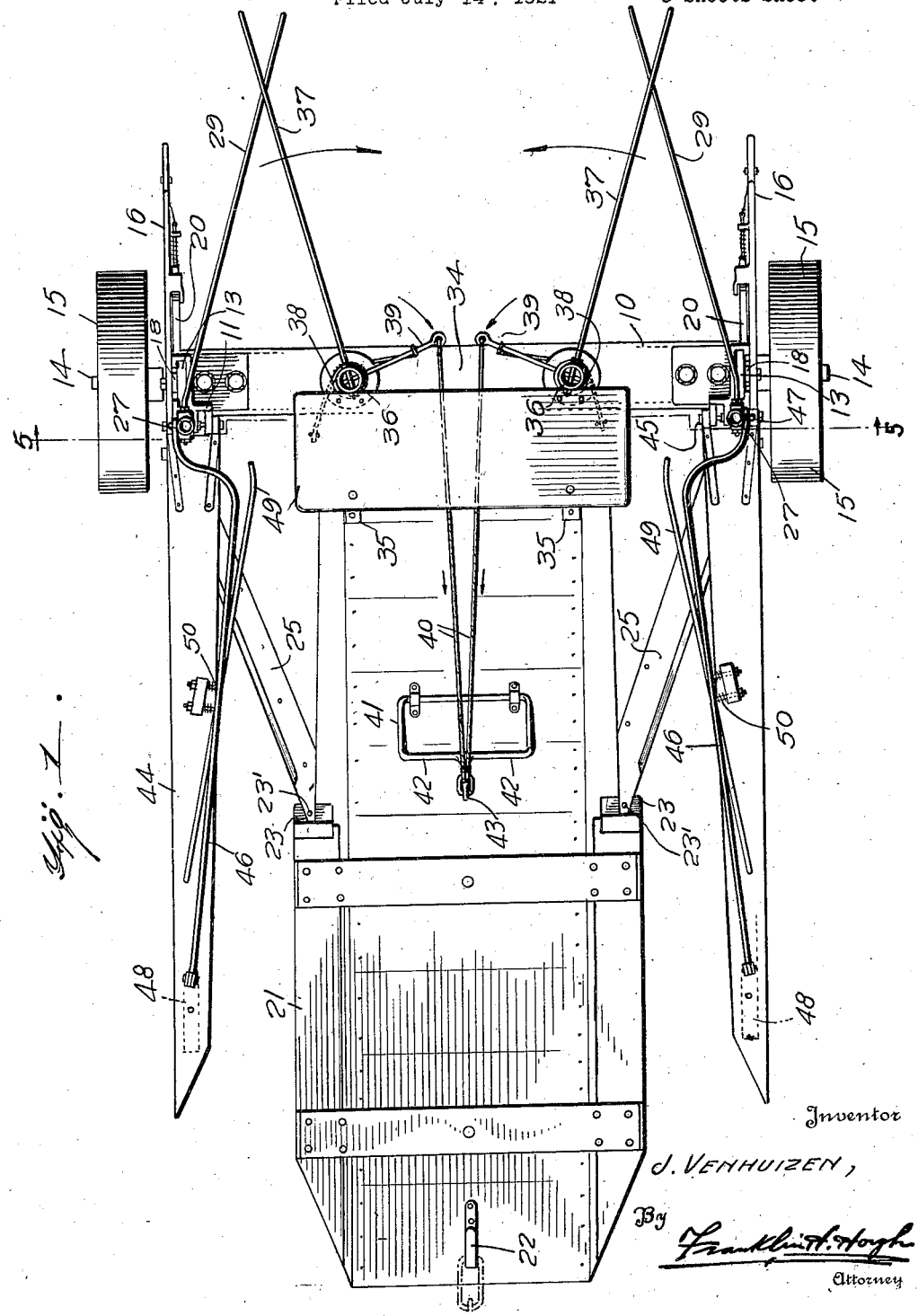

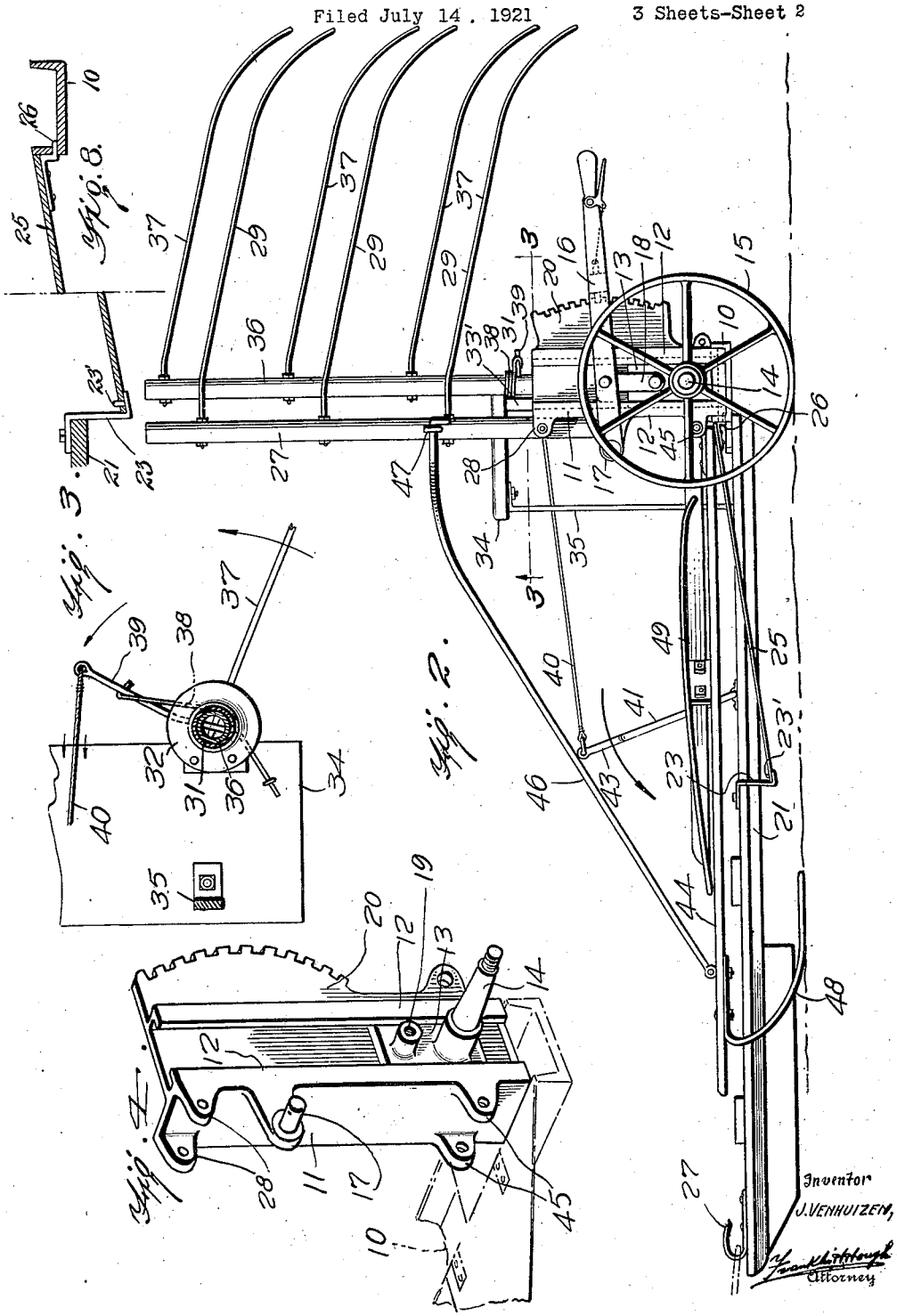

1,488,368

UNITED STATES PATENT OFFICE.

JOHN VENHUIZEN, OF HOLLAND, MICHIGAN.

CORN HARVESTER.

Application filed July 14, 1921. Serial No. 484,710.

*To all whom it may concern:*

Be it known that I, JOHN VENHUIZEN, a citizen of the United States, residing at Holland, in the county of Ottawa and State of Michigan, have invented certain new and useful Improvements in Corn Harvesters, of which the following is a specification, reference being had therein to the accompanying drawings.

This invention relates to corn harvesters and has for an object to provide a device of the class embodying new and improved features of economy of construction and upkeep, also convenience in operation with the minimum draft.

A further object of the invention is to provide a corn harvester having improved means for operating the restraining gates.

A further object of the invention is to provide a corn harvester having an improved type of cutting knife permitting the ready removal of the knife for grinding and the like and also providing for the yielding of said knife while encountering a rock or the like.

With these and other objects in view the invention comprises certain novel units, parts, elements, mechanical movements, functions and combinations as disclosed in the drawings, together with mechanical equivalents thereof, as will be hereinafter more fully described and claimed.

In the drawings:

Figure 1 is a top plan view of the improved corn harvester;

Figure 2 is a view of the corn harvester in side elevation;

Figure 3 is a horizontal inverted section through a fragment of the harvester showing the mounting and journaling of the restraining gates;

Figure 4 is a perspective view of the axle-supporting device;

Figure 5 is a transverse sectional view taken on line 5—5 of Figure 1;

Figure 6 is a perspective view of the knife removed;

Figure 7 is a fragmentary perspective view showing the arrangement and operation of the restraining gate mountings.

Figure 8 is a sectional view longitudinally through the floating knife and its supporting parts.

Like characters of reference indicate corresponding parts throughout the several views.

The improved corn harvester which forms the subject matter of this application comprises an axle 10 which is preferably of channel iron construction, although it is to be understood that the invention is not limited to such particular structural material. At the ends of the axle 10 uprights 11 are erected having overhanging flanges 12 receiving and permitting the sliding of a block 13 carrying the stub axle 14 upon which are journaled the supporting wheels 15. The sliding of the blocks 13 under the overhanging flanges 12 is controlled by manual lever 16 pivoted at 17 to the uprights 11 and by means of a link 18 with the boss 19 upon said block. The manual lever 16 is actuated in engagement with a segment 20 in the usual well known manner.

Rigidly secured to the axle 10 is a platform 21 which extends forwardly a sufficient distance to accommodate the various instrumentalities and to carry means as the hook 22 for the application of draft thereto. The platform 21 is provided with brackets 23 having studs 23' engaging perforations 24 in the knives 25. At the rear end the knives 25 are provided with lugs 26 which are inserted through perforations in the axle 10 so that the knives 25 are normally inclined upwardly toward the rear and may be lifted at their forward ends off from the studs 23' and, when so released, the lugs 26 may be withdrawn from their engagement with the axle 10 and the knives lifted out for grinding or the like. It is also obvious that, if a stone or similar obstruction engages the knives 25 from below, they may be lifted thereby to clear the stone or other obstruction without damage.

Upon the uprights 11 bars 27 are rigidly mounted by bolts or like fastening members through the ears 28 carried by said uprights. The bars 27 are provided with fingers 29 which extend convergently rearwardly of the axle, as shown more particularly at Figures 1 and 2.

Mounted also rigidly upon the axle 10 are pipes 31 in any approved manner, as by the foot 32 which is secured rigidly to the axle. The pipe 31 extends upwardly a limited distance and is provided with a flange 33, one of said pipes being situated upon each side of the central line of the machine and by means of the blocks 33' support the seat 34. Other supports from the seat 34 may be provided as braces 35 which extend downwardly to the platform 21.

Within the pipe sections 31 rods or pipes 36 are mounted to rotate and are provided with fingers 37 which also extend rearwardly of the machine and normally converge and preferably cross with the fingers 29 forming an angular inclosure for the retention and restraining of corn stalks positioned within such inclosure. The fingers 37 are held normally yieldingly in such closed or crossed relation by means of springs 38. The pipes 36 are provided with arms 39, rigidly secured thereto and to which are attached cables 40 extending forwardly to a foot lever fulcrumed conveniently relative to the seat 34. The foot lever, designated as 41, may of course be of any approved form or type, but preferably constructed as shown at Figures 1 and 2 in the form of a hollow rectangle providing space at 42 for supporting and receiving the pressure from either or both of the feet of the operator and with an extension 43 to which the cables 40 are preferably attached. It is obvious that by moving the foot lever in the direction indicated by the arrow in Figure 2, the cables 40 will act upon the levers 39 to swing the fingers 37 in the direction indicated by the arrows also in Figure 2 to open the space intervening between such fingers 37 and the fingers 29 to discharge the corn stalk standing in each interval.

For lifting lodged corn, corn lifters 44 are provided, pivoted to the uprights 11 at 45 and carrying braces 46 slidable through hooks or keepers 47 carried by the upright bars 27. This permits the corn lifters 44 to move about the pivots 45 as obstructions may make necessary, and a runner 48 is preferably provided at each, as shown more particularly at Figure 2. A guide 49 is attached to each of the corn lifters by means of the spring connection 50 extending rearwardly above the knives 25, acting in conjunction with the braces 46 which are also adapted to properly tilt the tops of the corn stalks toward the operator seated upon the seat 34 so that the stalks severed by the knives 25 may be grasped manually by the operator and moved rearwardly into the recess between the fingers 29 and 37. When a sufficient volume of the corn stalks have been thus placed manually, the fingers 37 are swung by oscillating the pipe 36 through the medium of the foot lever 41 and associated parts to dump the corn stalks so supported upon the ground in the rear of the forwardly progressing machine.

The inclination of the fingers 29 converging as they do to the rear serves to move the accumulated corn stalks in each inclosure to a single point and deposit them as one bundle upon the ground.

From the foregoing description of the operation accompanying the description of the structure, it is believed that the operation in its entirety will be fully understood and further description will be surplusage.

What I claim is:

1. A corn harvester comprising a supporting structure including an axle and a platform in front of the axle, corn-severing means carried by the platform, separable fingers at the rear of said severing means and extending rearwardly beyond the supporting structure, means to hold said fingers normally yieldingly closed, and a foot lever fulcrumed upon the platform appropriately connected to move the fingers to open position against the stress of the yielding means.

2. A corn harvester comprising a supporting structure including an axle and a platform in front of the axle, corn-severing means including a floating knife carried by the platform, separable fingers at the rear of said severing means and extending rearwardly beyond the supporting structure, means to hold said fingers normally yieldingly closed, and a foot lever fulcrumed upon the platform appropriately connected to move the fingers to open position against the stress of the yielding means.

3. A corn harvester comprising a supporting structure including an axle and a platform in front of the axle, corn-severing means carried by the platform including separate units, one spaced upon each side of such platform, separable fingers, one pair at the rear of each of said severing means and extending rearwardly beyond the supporting structure, means to hold said fingers normally yieldingly closed, and a foot lever fulcrumed upon the platform appropriately connected to move the fingers to open position against the stress of the yielding means.

4. A corn harvester comprising a supporting structure including an axle and a platform in front of the axle, corn-severing means including a floating knife carried by the platform including separate units one spaced upon each side of said platform, separable fingers, one pair at the rear of each of said severing means and extending rearwardly beyond the supporting structure, means to hold said fingers normally yieldingly closed, and a foot lever fulcrumed upon the platform appropriately connected to move the fingers to open position against the stress of the yielding means.

In testimony whereof I hereunto affix my signature in presence of two witnesses.

JOHN VENHUIZEN.

Witnesses:
THOS. H. MARSILSE,
CORNELIA KURZ.